United States Patent [19]

Maekawa

[11] Patent Number: 4,850,783
[45] Date of Patent: Jul. 25, 1989

[54] PALLETIZING SYSTEM FOR ARTICLES

[75] Inventor: Hiroshi Maekawa, Joyo, Japan

[73] Assignee: Murata Kikai Kabushiki Kaisha, Kyoto, Japan

[21] Appl. No.: 802,703

[22] Filed: Nov. 27, 1985

[30] Foreign Application Priority Data

Dec. 1, 1984 [JP] Japan ............................ 59-254767

[51] Int. Cl.⁴ .................... B65G 57/20; B66F 9/06
[52] U.S. Cl. .................... 414/792.9; 186/55;
414/268; 414/281; 414/284; 414/286; 414/392;
414/396; 414/572; 414/736; 414/799
[58] Field of Search ............. 186/55, 56; 414/41,
414/28, 266, 268, 281, 284, 286, 70, 71, 343,
345, 390, 391, 392, 396, 402, 572, 736

[56] References Cited

U.S. PATENT DOCUMENTS 3,082,495 3/1963 Miller, Jr. .................... 414/343 X
3,313,429 4/1967 Cole ............................ 414/392
3,716,147 2/1973 Pipes ........................... 414/21 X

FOREIGN PATENT DOCUMENTS 2350919 4/1974 Fed. Rep. of Germany ........ 414/71
2317679 10/1974 Fed. Rep. of Germany ........ 414/71
2724978 12/1978 Fed. Rep. of Germany ........ 414/17
2042460 9/1980 United Kingdom ................ 414/71
2084113 4/1982 United Kingdom ............... 414/663

Primary Examiner—Robert J. Spar
Assistant Examiner—Janice Krizek
Attorney, Agent, or Firm—Spensley Horn Jubas & Lubitz

[57] ABSTRACT

A palletizing method for articles by a robot wherein a final stacking pallet is moved as a hand portion of the robot moves, and when an article is loaded on the pallet, the final stacking pallet is made to assume a position in the neighborhood of a position where the article is gripped up by the robot hand to transfer the article.

10 Claims, 4 Drawing Sheets

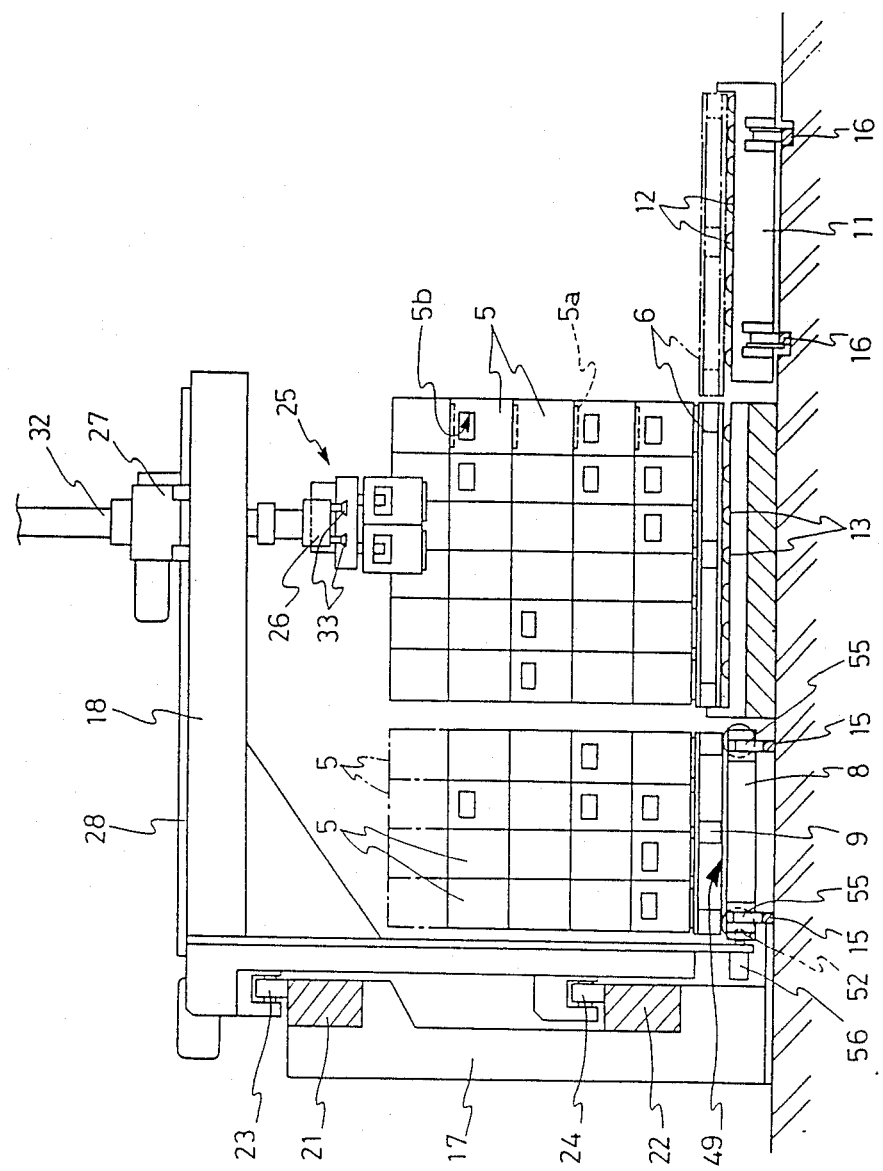

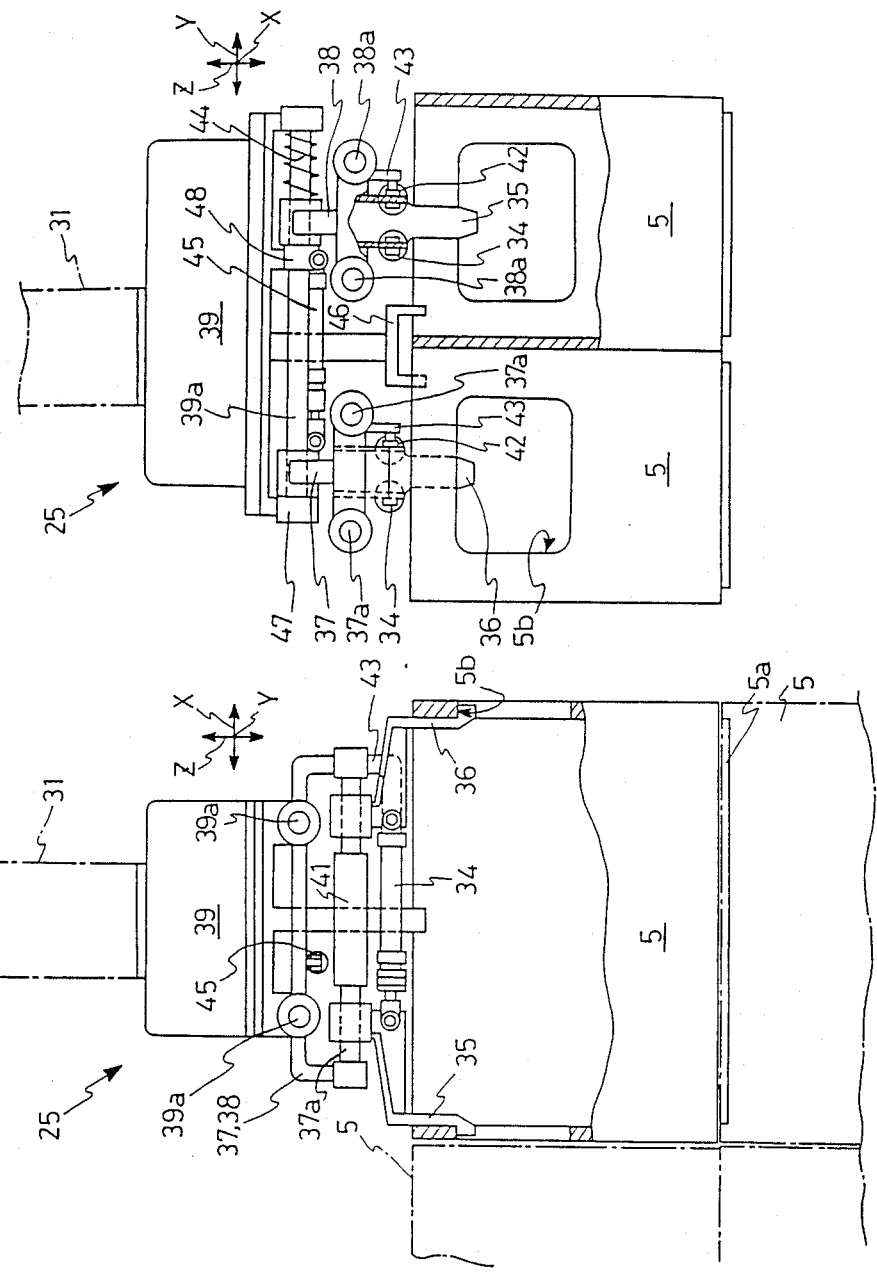

PALLETIZING SYSTEM FOR ARTICLES

FIELD OF THE INVENTION AND RELATED ART STATEMENT

This invention relates to a palletizing method for articles by an industrial robot.

There has been proposed a palletizing operation which comprises stacking each kind of article in a variety of articles on individual pallets, gripping up the desired kind of articles by the desired number from the individual pallets, and mixing and loading various kinds of articles on specific empty pallets.

The industrial robot may be conveniently used in the event that the above-described operation is automated so that the articles are gripped up from the individual pallets and then accurately stacked on the empty pallets to provide for an orderly condition of stacking articles on the loaded pallets. Particularly, in the case where the articles have a special configuration such as buckets which are fitted each other top and bottom so that they are stacked in a multiple stage manner, high precision of positioning is required. Therefore, in such a case, the industrial robot has to be used to realize such operation.

If the aforesaid palletizing operation is carried out while effecting traverse movement by using, for example, a conventional cylindrical coordinates robot as schematically shown in FIG. 6, it is no doubt that the gripping-up operation (depallet operation) for articles from individual pallets 2 and stacking operation (palletizing operation) for a final stacking empty pallet 4 may be carried out accurately to stack the articles 3 orderly without getting out of shape. On the other hand, however, the number of articles that are conveyable by a single conveying operation is limited to, say, a few articles, and in addition, the gripped-up few articles have to be conveyed to the empty pallets by the traverse movement of the robot itself whenever necessary. Therefore, this type of operation has a disadvantage that the processing efficiency per hour is extremely poor.

Even if an attempt is made so as to modify a hand portion of the robot into more than two hands capable of gripping multiple articles in order that the number of articles handled by the single depalleting operation and palletizing operation may be increased, the hand portion becomes bulky and increases in weight. Therefore, this proposal incurs significant obstacles in that the cost increases and the construction is inadequate, that the main depalleting and palletizing operations cannot be carried out smoothly, that is, it is extremely difficult to simultaneously and conveniently grip a number of articles placed in a somewhat roughly positioned state on the functional portion for gripping the articles, and that the casing itself in the hand portion interferes with articles other than target articles on the pallets to render the hand impossible to access to the target articles.

OBJECT AND SUMMARY OF THE INVENTION

It is an object of the present invention to overcome the problem of the low processing efficiency per hour without giving rise to new inconveniences as noted above, when the industrial robot is used for the palletizing operation as described above.

This invention proposes an arrangement wherein a final stacking pallet is moved as a hand portion of a robot moves, and when articles are stacked into said pallet, said final stacking pallet is positioned in the neighbourhood of a position where the articles are gripped up by the hand of the robot to reduce as short as possible the distance of transporting the article gripped by the hand, thus minimizing the entire required time.

BRIEF DESCRIPTION OF THE DRAWINGS

FIGS. 1 to 4 show the examples of the palletizing system using a cross coordinates robot.

FIG. 1 is an entire plan view,

FIG. 2 is a sectional view taken on line II—II of FIG. 1,

FIG. 3 is a side view of the robot hand, and

FIG. 4 is a front view thereof.

DETAILED DESCRIPTION OF PREFERRED EMBODIMENTS

Referring first to FIGS. 1 to 4, a palletizing system for plastic cases in which suitable articles (bottled beverages, etc.) are encased will be described.

Figure 1:
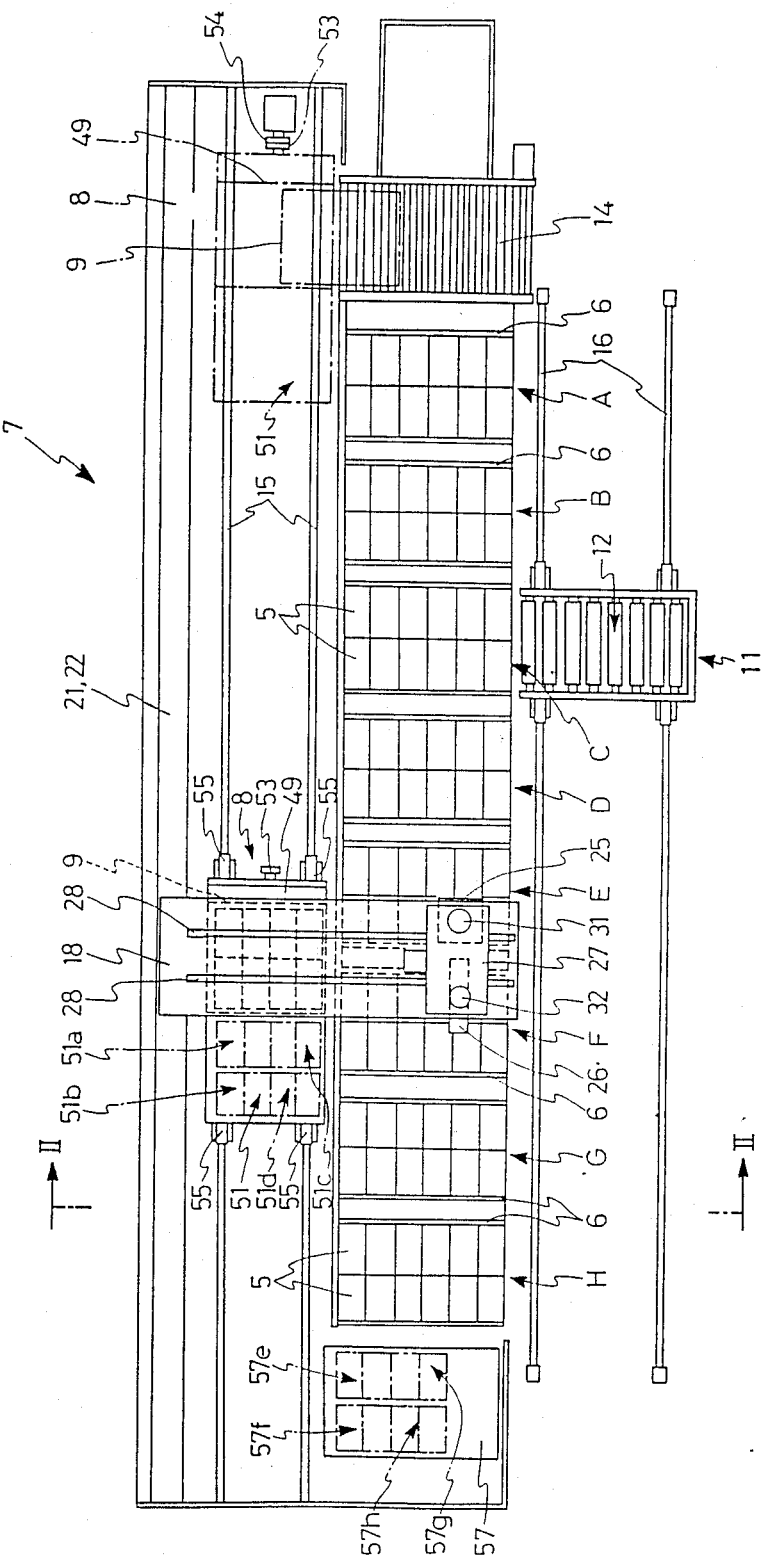

In the illustrated palletizing system, as shown in FIG. 1 which is a plan view, approximately rectangular parallelepiped shaped plastic cases 5 having articles encased therein are depalleted every suitable numbers from the top of large pallets 6 at eight locations A, B, C, D, E, F, G and H by means of a cross coordinates robot 7, and then variously mixed and stacked on a final stacking small pallet 9 on the later-described moving vehicle 8. The articles within each of the plastic cases 5 at the eight locations A, B, ... H are different in kind from each other, and the illustrated robot 7 grips and raises the cases 5, the number of which are instructed by the unshown control device, from the large pallet 6 at each position onto the small pallet 9 to transfer it thereon.

Reference numeral 11 denotes a vehicle for moving in and out the large pallets 6 which travel parallel to the eight places where the large pallets 6 are put. Movement of the large pallets 6 onto the vehicle 11 is effected by a fork-lift or the like, and transfer of the pallets 6 from the vehicle 11 to the large pallet yard is effected by a roller conveyor 12 on the vehicle 11.

A number of free balls 13 are provided on the upper surface of each of the locations of the large pallet yard (FIG. 2).

Reference numeral 14 denotes a slat conveyor which is a station for moving in and out the small pallet 9 provided at one end of the large pallet 6 yard. Movement of the small pallet 9 in and out of the slat conveyor 14 is effected by a fork-lift or the like. Reference numerals 15, 16 denote rails for the moving vehicle 8 and the vehicle 11, respectively.

The cross coordinates robot 7 and the moving vehicle 8 will be described in detail.

A gate-type X-axis frame 17 of the cross coordinates robot 7 in this embodiment is extended lengthwise adjusted to the yard for the large pallets 6 so that a movable Y-axis frame 18 may be moved for a long span. A moving frame 27 supporting later-described hands 25, 26 thereon is movably provided on the Y-axis frame 18 supported through rollers 23, 24 on upper and lower rails 21, 22 on the X-axis frame 17.

Reference numeral 28 denotes a rail on the Y-axis frame 18 for the moving frame 27.

The moving frame 27 has two lifting arms 31, 32 supported thereon. At the lower ends of the arms 31, 32 are mounted a hand 25 for gripping and raising the plastic case 5 and a hand 26 for attracting and raising a cardboard box, so that even if articles to be handled are changed, the aforesaid hands 25, 26 may be selectively used to palletize any form of articles.

The hand 26 is a conventional robot hand which has a vacuum pad 33 capable of attracting and raising three boxes at a time, whilst the case gripping hand 25 has the following construction.

The plastic case 5 on each large pallet 6 is placed on the pallet 6 at a predetermined position and orientation but the positional accuracy thereof is rough (approximately ±20 mm in both X and Y directions). The hand 25 has to grip up the case 5 loaded with the rough positioning accuracy and stack it at a predetermined accurate position on the small pallet 9 after movement. In addition, the case 5 has the shape in which bottom surface and upper surface thereof are fitted into each other (FIG. 3). All the cases 5 on the pallets 6, 9 have to be loaded in the state where the upper case 5 is fitted into the lower case 5. The hand 25 is designed to have the characteristic construction as described below so as to meet the aforesaid condition.

More specifically, as shown in FIGS. 3 and 4, the hand 25 is of the so-called double-hand type, which comprises moving frames 37, 38 supporting a pair of grip pawls 35, 36 opened and closed by means of a cylinder 34, and a support frame 39 slidably supporting the moving frames 37, 38 in a direction perpendicular to the opening and closing direction of the grip pawls 35, 36, said lifting arm 31 being connected to the support frame 39.

Reference numerals 37a, 38a denote guide rods which constitute a part of the moving frames 37, 38, and reference numeral 39a denotes a guide rod which constitutes a part of the support frame 39. A stopper 41 is provided in the midst of the guide rods 37a, 38a. The stopper 41 controls the moving end (closing width) when the grip pawls 35, 36 are closed by the cylinder 34, and controls the rightward moving end when the whole body of the grip pawls 35, 36 griping the case 5 between the opened grip pawls 35, 36 and the case 5 is moved rightward in FIG. 3 by the positioning cylinder 42, that is, the right-hand position in FIG. 3 of the case 5 with respect to the hand 25.

More specifically, let lateral direction in FIG. 3 represent the X-axis direction, the case 5 gripped by the grip pawls 35, 36 is positioned in the position in the X-axis direction with respect to the hand 25 by the abutment of the distal end of the grip pawl 35 with the stopper 41 by the retracting operation of the cylinder 42.

Reference numeral 43 denotes a mounting bracket for the positioning cylinder 42, the bracket being projectingly secured to each of the moving frames 37, 38.

A compression spring 44 is interposed between the moving frame 38 and the support frame 39. A cylinder 45 which is expansible in a lateral direction in FIG. 4 (in the Y-axis direction) is connected between the moving frame 37 and the support frame 39 so that when the cylinder 45 is contracted, the whole body consisting of the case 5, the grip pawls 35, 36 and the moving frames 37, 38 in the state shown in FIG. 4 is moved in a lateral direction in FIG. 4, and the internal surface of the case 5 supported on the moving frame 37 comes into abutment with a positioning bracket 46 vertically suspended from the support frame 39 for positioning.

Flange-like stoppers 47, 48 provided on the guide rod 39a control the lefthand position in FIG. 4 (the position in the Y-axis direction) of each of the moving frames 37, 38 when the cylinder 45 and spring 44 are expanded.

The hand 25 is designed to have its outer edge in plan smaller than an outer edge of the two aligned cases 5. Even in the case where separate cases 5 are stacked one upon another about the desired case 5 to be gripped, the hand 25 may be moved down to an access position directly above the case 5 to be gripped.

It is to be noted that the positioning in the X-axis direction of the case 5 gripped by the grip pawls 35, 36 with respect to the hand 25 can be carried out by the expansion of the positioning cylinder 42.

Next, the moving vehicle 8 will be described. The moving vehicle 8 can travel on the rail 15 laid parallel to the rails 21, 22 in the X-axis direction of the robot 7. One half of the upper surface thereof is constructed as a slat conveyor 49 for receiving the small pallet 9 whereas the other half is for a temporary bed 51 for articles such as the cases 5 or boxes.

. In the illustrated embodiment, the moving vehicle 8 has no drive and may be moved on the rail 15 along the frame 18 for the first time when a retractable connection pin 52 provided on the movable Y-axis frame 18 of the robot is fitted into a recessed hole formed in the side thereof. When the connection pin 52 is disengaged from fitting with the hole as the result of movement in and out of the frame 18, the vehicle 8 continues stopped at the position where the fitting is disengaged.

An input shaft of the slat conveyor 49 is projected as a clutch piece 53 on the side of the vehicle 8 so that at the position (indicated at the broken line in FIG. 1) where the vehicle 8 is connected to the Y-axis frame 18 as described above and moved to the rightmost end in the X-axis direction, the input shaft clutch piece 53 is engaged with a clutch piece 54 as a rotational output shaft provided on the floor, in which state the slat conveyor 49 may be rotated on the vehicle 8 for the first time.

Reference numeral 55 denotes a wheel, and 56 is a cylinder for moving the connection pin 52 forward and backward.

The place position of the case 5 on the temporary bed 51 is divided into eight positions likewise the place position to the small pallet 9 as shown by the chain line in FIG. 1 so that in the present system, the upper four kinds of cases 5 (for example, cases on the large pallets 6 at the positions A, B, C and D) which are often handled take the precedence over the remaining cases and are temporarily placed on predetermined place areas 51a, 51b, 51c and 51d on the temporary bed 51, whilst four kinds of cases 5 (for example, cases on the large pallets 6 at the positions E, F, G and H) which are less handled are temporarily placed on the fixed temporary bed 57 provided at the leftmost end in FIG. 1 of the large pallet 6 yard.

The place position for the cases 5 on the fixed temporary bed 57 is also divided into eight positions as shown by the chain line in FIG. 1 so that various kinds of cases are placed on specific place areas 57e, 57f, 57g and 57h. Presence or absence of the cases of various kinds on the temporary bed 51 and fixed temporary bed 57 may be detected by means of a detector (not shown) such as a micro-switch, a photoelectric switch or the like provided on the beds 51, 57.

In the following, the operation of the aforementioned palletizing system will be described.

Prior to entry into the operation of the system, the aforesaid moving-in and out vehicle 11 is used to move and place the large pallets 6 with a large quantity of various kinds of cases 5 loaded thereon on the large pallet yards at the positions A, B, ... H.

In this case, if the pallets are moved in from left to right in FIG. 1 in accordance with the order of those which are frequently handled in the system first, the moving distance of the Y-axis frame 18, namely, the robot hands 25, 26, may be shortened.

The kind of articles within the cases 5 on the large pallets 6 at the positions thus moved in are hereinafter referred to as the kind A, kind B ... kind H corresponding to the respective positions A, B, ... H.

Also, the slat conveyor 14 is used to move the small pallet 9 onto the slat conveyor 49 of the moving vehicle 8.

More specifically, the moving vehicle 8 connected to the Y-axis frame 18 is moved to the position as indicated by the chain line in FIG. 1, the clutches 53, 54 are brought into engagement with each other to simultaneously drive the slat conveyor 49 on the vehicle 8 and the slat conveyor 14 at the moving-in and out station, and the empty pallet 9 on the slat conveyor 14 is moved onto the vehicle 8 (the broken line in FIG. 1).

Upon preparation of the aforesaid initial condition, the cross coordinates robot 7 is actuated in accordance with the program by means of the control device. Commands of the robot 7 include the connection between the Y-axis frame 18 and the moving vehicle 8 and connection-release commands (that is, the command for forward and backward timing of the pin 52). The movement of the moving vehicle 8 is carried out in complete synchronism with the palletizing operation of the cases 5 by the robot 7.

More specifically, for example, where 15 cases of kind A, 8 cases of kind B, and 9 cases of kind C are loaded on the small pallet 9, the Y-axis frame 18 is first moved to the position A with the moving vehicle 8 connected, and at said position the connection is once disengaged to stop the vehicle 8. Then, the Y-axis frame 18, the lifting arm 31 and the hand 25 are actuated to grip 14 cases 5 from the large pallet 6 at the position A to transfer it onto the small pallet 9 (of course, this operation is carried out by lifting two cases every seven cycles).

After the 14 cases of kind A have been loaded, the Y-axis frame 18 is again connected to the moving vehicle 8 to move the vehicle 8 to the position B, after which the connection is again released to stop the vehicle 8 at the position B. Similarly, the Y-axis frame 18, the lifting arm 31 and the hand 25 are actuated to transfer eight cases 5 from the large pallet 6 at the position B to the small pallet 9.

Next, similarly, the moving vehicle 8 is moved to the position C, and the eight cases 5 are transferred from the large pallet 6 at the position C to the small pallet 9.

In this manner, the loading of a major portion other than those of a fraction of cases to be loaded for various kinds has been completed. Next, a fraction of cases (namely, the robot hand 25 in this embodiment is of the double hand, and therefore, the fraction is always one) will be processed in the following procedure.

After the loading of the cases other than a fraction for the kind C, two cases 5 are gripped up by the hand 25 similarly at the position C, either one of the gripped cases 5 is placed on the predetermined place area 51c of the temporary bed 51 whilst the remaining case 5 still being gripped is stacked on the case 5 already stacked on the small pallet 9. Next, the Y-axis frame 18 is connected to the moving vehicle 8 and moved to the position A, at which position, two cases 5 are gripped up by the hand 25 in a similar manner, and either one of the gripped cases 5 is placed on the predetermined place area 51a of the temporary bed 51 whilst the remaining case 5 still being gripped is stacked on the small pallet 9 to terminate the processing of the fraction.

In the aforementioned operation, 15 cases of kind A, 8 cases of kind B and 9 cases of kind C are loaded on the small pallet 9 as scheduled, and the cases of kind A and kind C are each temporarily placed on the temporary bed 51. In this condition, the small pallet 9 is filled with the cases thereon, and therefore, the moving vehicle 8 is moved to the slat conveyor 14 position at the right end in FIG. 1, and as described above, the clutches 53 and 54 are brought into engagement with each other to drive the slat conveyor 14 to move out the fully loaded small pallet 9.

Since the construction of the hand 25 is designed to have the positioning function as previously mentioned, the gripping and raising of the cases 5 by the hand 25 (depalleting operation) and the operation for placing the cases on the small pallet 9 (palletizing operation) are carried out such that even if the case positioned on the large pallet 6 is in the roughly positioned state, the cases may be gripped and raised in a good order and in addition the cases are placed in position on the small pallet 9. Also, fitting of a fitting portion 5a of the case 5 bottom is well carried out (which will be described in detail later).

It is assumed that the next small pallet 9 is moved onto the moving vehicle 8 and then 15 cases of kind A, 9 cases of kind B and 8 cases of kind C are loaded on the small pallet 9. Loading of a major portion other than a fraction is achieved in a manner similar to the foregoing. But the loading of a fraction is carried out in the following procedure by making use of the cases 5 remaining on the temporary bed 51 by the previous palletizing operation.

Prior to entry into the fraction processing, 14 cases of kind A, 8 cases of kind B and 8 cases of kind C are loaded in the procedure similar to the previous procedure, and after termination of this operation, the cases of kind A and kind B have to be loaded one by one. To this end, the moving vehicle 8 is first moved to the position B to stop it thereat. Two cases 5 of kind B are gripped and raised by the hand 25, and either one of the cases 5 is placed on the area 51b for the kind B on the temporary bed 51 whilst the case 5 for kind A on the temporary bed 51 is gripped and raised by the stand-by grip pawls 35, 36 while gripping the other case 5 of kind B. In this manner, the cases 5 of different kinds A and B are each gripped simultaneously by the hand 25 and at the same time they are transferred onto the small pallet 9 to collectively place them thereon.

Accordingly, the case 5 of kind C remains on the temporary bed 51, and the case 5 of kind C is also used for the thereafter palletizing operation.

Incidentally, the presence or absence of the cases in the place areas 51a, 51b, 51c and 51d on the temporary bed 51 are detected by the microswitch or the like as previously mentioned. However, since the place areas 51a, 51b, 51c and 51d respectively occupy the area for two case 5 portions, namely, since a space for at least one case is formed on the side of the case 5 placed, it is possible to allow the gripping operation for the other case 5 on the temporary bed 51 while the case 5 is being gripped by one grip pawls 35, 36. The same is true for the fixed temporary bed 57.

While in the above-described example of operation, the cases 5 are depalleted only from the large pallets 6 at the positions A, B and C, it will be noted that the cases 5 can be similarly depalleted from the large pallets 6 at other positions. In the illustrated system, where the depallet operation for the fraction processing is effected from the large pallets 6 at the positions E, F, G and H, the fixed temporary bed 57 is used to temporarily place the cases 5 of various kinds (E, F, G and H) on the temporary bed 57. However, in the case where the kinds of the large pallets 6 are small in number, namely, in the case where the kinds are small in number, the fixed temporary bed 57 need not be provided. In the case where many kinds of the large pallets 6 are present, if the area of the temporary bed 51 on the moving vehicle 8 is increased, the cases of kinds from the all the large pallets 6 may be temporarily placed on the moving vehicle 8.

Next, the gripping and raising operation (depalleting operation) for the cases 5 by the hand 25 and the placing operation (palletizing operation) for the cases on the small pallet 9 will be described.

As previously mentioned, the plastic cases 5 are stacked on the large pallets 6 with the positioning accuracy of approximately ±20 mm and the upper surface and bottom surface thereof are fitted each other. Therefore, the hand 25 first closes the grip pawls 35, 36, and the moving frames 37, 38 move downward under the state that they are in contact with the left end in FIG. 4 to insert the extreme ends of the grip pawls 35, 36 into the case 25, after which low pressure oil is fed into the cylinder 34 to open the grip pawls 35, 36 into engagement with handle holes 5b of the cases 5.

When the grip pawls 35, 36 engage the case 5, movement of the grip pawls 35, 36 in the horizontal surface (movement in both the X and Y-axis directions) is maintained by the guide rods 372, 38a and 39a (at that time, the positioning cylinders 42, 45 are expansible), and therefore, even if the position of the case 5 is deviated from a normal position, the grip pawls 35, 36 are opened so as to be adjusted to the position of the case 5 not to apply an excessive force to the case 5 whereby even when the case 5 is fitted in the lower-level case 5, gripping and raising may be accomplished without any inconvenience (in case of this embodiment, the handle hole 5b is wide in the Y-axis direction, and no problem occurs in the Y-axis direction).

When the hand 25 is moved upward to raise the case 5 under the condition that the grip pawls 35, 36 are open into engagement at low pressure as described above, return portions of the extreme ends of the grip pawls 35, 36 is placed in positive engagement with the upper surface of the handle hole 5b by the case's own weight, at which time the pressure fed to the cylinder 34 is switched to high pressure and the positioning cylinders 42, 45 are contracted to position the case 5 in the X and Y-axis directions.

In the aforesaid procedure, the positioning of the case 5 with respect to the hand 25 is achieved, whereby loading of the cases on the small pallet 9 or on the temporary beds 51, 57 is accurately carried out at the set position, and fitting of the upper and lower cases 5 each other is smoothly carried out to stack them properly.

While in the aforementioned operation, the palletizing of the plastic cases 5 by the hand 25 has been described, it will be noted that the palletizing of cardboard boxes stacked on the large pallets 6 on the small pallet 9 may also be carried out in the similar operation.

Figure 5:
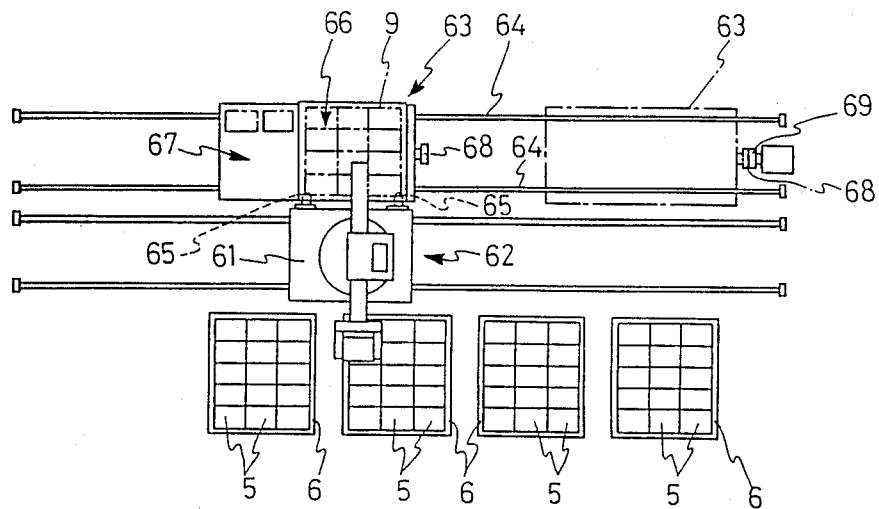
FIG. 5 is a plan view of a palletizing system using a cylindrical coordinates robot.
Figure 6:
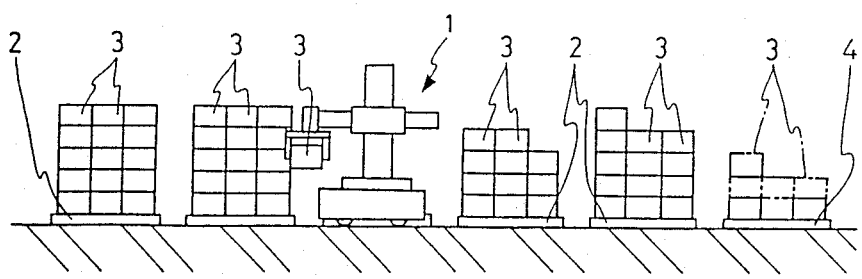
FIG. 6 is a schematic view for explanation of a palletizing method in accordance with prior art.

Next, an example of the other system will be described by reference to FIG. 5. Unlike the above-described system, this system uses a cylindrical coordinates robot 62 loaded on a traverse device 61. The yard for the large pallets 6 and a moving path 64 for a moving vehicle 63 are lain along the traverse route of the robot 62. The moving vehicle 63 is connected with the traverse device 61 by fitting a pin 65 moved forward and backward by a suitable cylinder into a recessed hole on the other side. A conveyor 66 for transferring the small pallet 9 is provided on the moving vehicle 63, and a temporary bed 67 is provided.

The depalleting operation for the article 5 from the large pallet 6 by the robot 62 and the palletizing operation for the case on the small pallet 9 may be accomplished in the procedure similar to that as described previously.

In the conveyor 66 on the moving vehicle 63 in the above-described embodiment, an input shaft 68 is clutch-connected at the moving end to a suitable output shaft 69 on the floor so that the conveyor may be driven. It will be noted however that an independent drive source may be mounted on the moving vehicle 63 to drive the conveyor 66 and move it along the moving path 64 without requiring any input from the outside.

It will be further noted that the upper surface of the traverse device 61 of the robot may be modified into a larger area to form the upper surface of the traverse device 61 into a temporary bed, and that other types such as multi-articulated type of the robot may also be employed.

As will be apparent from the foregoing, in accordance with the method of the present invention, the palletizing operation as described at the beginning of the specification may be performed with high processing efficiency by use of the industrial robot.

What is claimed is:

1. A system for palletizing articles encased in stacked cases, comprising:
    an X-axis frame having first rails extending adjacent said stacked cases;
    a movable Y-axis frame supported by said first rails;
    a movable hand, supported by said Y-axis frame, for gripping and raising cases;
    second rails substantially parallel to said first rails;
    a moving vehicle, adapted to travel on said second rails, having a pallet thereon;
    a connecting means for selectively engaging and disengaging said moving vehicle and said moveable Y-axis frame; and
    positioning means for positioning cases gripped by said moveable hand on said pallet.

2. A system as claimed in claim 1, further comprising:
    at least one roller for supporting said Y-axis frame on the first rails; and
    a first moving frame movably supported on the Y-axis frame, for supporting said hand.

3. A system as claimed in claim 2, wherein said first moving frame comprises:
    a lifting arm; and
    a first hand, supported on the lighting arm, for gripping and raising cases.

4. A system as claimed in claim 3, wherein said first moving frame further comprises:

a second hand, supported on the lifting arm, for gripping and raising cardboard boxes.

5. A system as claimed in claim 3, wherein said first hand is a double hand, further comprising:
a second moving frame connected to said lifting arm;
a pair of grip pawls supported on said second moving frame;
means for opening and closing said grip pawls, where opening and losing movement of the grip pawls occur in a first direction; and
a support frame slidably supporting the second moving frame for sliding in a second direction substantially perpendicular to the opening and closing direction of the grip pawls.

6. A system as claimed in claim 5, wherein said first hand further comprises:
a stopper supported by the second moving frame for controlling the position of a gripped case with respect to the first hand.

7. A system as claimed in claim 6, wherein said first hand being smaller in width than the width of two aligned cases.

8. A system as claimed in claim 1, wherein said moving vehicle comprises:
an upper surface;
a slat conveyor, constructed on substantially one-half of said upper surface, for receiving said pallet; and
a temporary bed, on the portion of said upper surface not having said slat conveyor constructed thereon, for receiving cases thereon.

9. A system as claimed in claim 1, wherein said connecting means comprises:
a retractable connection pin provided on the movable Y-axis frame;
wherein said moving vehicle contains a hole for receiving said retractable connection pin therein.

10. A system as claimed in claim 1, further comprising:
a conveyor means, disposed on said moving vehicle, for receiving and conveying said pallet;
a first clutch means, disposed on said moving vehicle, operable to drive said conveyor means;
a second clutch means, disposed off of said moving vehicle, operable to engage with and drive said first clutch means.

* * * * *